Feb. 28, 1956  W. BRÜMMERHOFF  2,736,498

GAS FIRED STORAGE WATER HEATER

Filed Feb. 2, 1952

Walter Brümmerhoff
Inventor

United States Patent Office 2,736,498
Patented Feb. 28, 1956

2,736,498

GAS FIRED STORAGE WATER HEATER

Walter Brummerhoff, Remscheid-Lennep, Germany, assignor to Johann Vaillant Kommanditgesellschaft, Remscheid, Germany Application February 2, 1952, Serial No. 271,950

1 Claim. (Cl. 236—20)

This invention relates to a gas-fired hot-water heater with storage tank of the type in which the water, heated in a continuous-flow heater, circulates, due to its convective forces, between continuous-flow heater and storage tank.

In such combined hot-water heaters it is usual to recirculate the stored water again through the continuous-flow heater for reheating as it is drawn from the storage tank. This results in the advantage that the water may be stored at temperatures which are below the service temperature at which it is desired to deliver the hot water, whereby heat losses are diminished.

Figure 1:
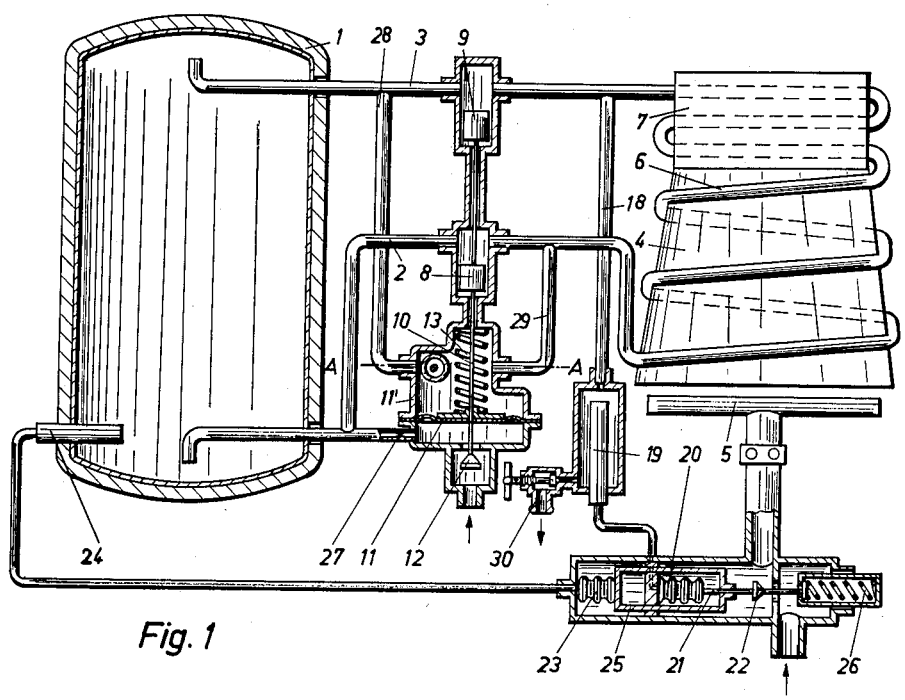
Figure 2:
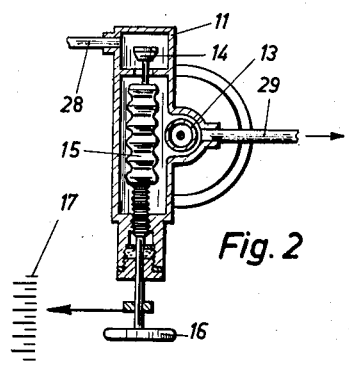

It is an object of the invention to improve such combined hot-water heaters with thermic circulation and reheating arrangement by providing them with suitable control devices ensuring a constant and settable leaving water temperature even if the warm water leaving the storage tank will become gradually colder by its mixture with the inflowing cold water. Another object of the invention is the provision of a shutoff member which is simple and practical in construction, reliable in service and adapted to be actuated to cut off thermal circulation when water is withdrawn. Along with this, certain elements provided for the automatic control of the aforesaid shutoff member can at the same time be employed for actuating the control device as will more fully appear from the following description of two typical forms of the invention, throughout which description reference is made to the accompanying diagrammatic drawings, in which:

Fig. 1 is a part sectional elevation of the combined hot-water heater provided by the invention, also showing the water and fuel gas regulators, Fig. 2 is a sectional view of the water regulator taken in the plane of the line A—A in Fig. 1.

In the construction illustrated in Fig. 1 the all round insulated storage tank 1 is connected by means of a lower connecting pipe 2 and an upper connecting pipe 3 with a continuous-flow heater of known construction which therefore need not be more fully described. This continuous-flow heater consists of a flue 4 arranged above a gas burner 5. Further, said flue is surrounded by a water-carrying pipe coil 6 and closed at the top by a finned heating element 7 multipassed by said pipe coil 6.

Each of the connecting pipes 2, 3 is provided with a slide valve 8, 9. Both pistons 8, 9 are connected by means of a control rod 10 with each other and with a rubber diaphragm 11. The lower end of the control rod 10 carries a valve member 12. The diaphragm 11 divides the space within the diaphragm housing 11' into a lower and an upper chamber. The lower chamber is, through the control valve 12, in communication with the cold-water supply pipe. In addition, the lower chamber is in communication with the storage tank 1 and lower connecting pipe 2 respectively through a restricted pipe 27. The diaphragm 11 is spring-loaded by means of a compression spring 13 arranged within the upper chamber. The upper chamber is, through a by-pass pipe 28, in communication with the upper connecting pipe 3, and through another by-pass pipe 29 in communication with the lower connecting pipe 2. The by-pass pipes 28, 29 are so arranged that with closed shutoff valves 8, 9 communication is established from the upper connecting pipe 3 through the upper diaphragm chamber with the lower end of the pipe coil 6. In entering from the by-pass pipe 28 into the upper chamber the water must pass through a throttling point which is controlled by a valve member 14 (see Fig. 2). The valve member 14 is mounted on a thermostat 15 arranged in the upper chamber and axially displaceable by means of a screw spindle and handwheel 16. For the setting of the thermostat 15, a scale 17 divided in degrees of temperature is provided and cooperates with an indicator. The tapping pipe 18 is, on the continuous-flow heater side, in communication with the connecting pipe 3. Mounted in an enlargement of the tapping pipe 18 is a thermosensitive member 19 in communication with a flexible metal bellows 20 through a capillary. A tapping valve 30 is connected to the lower end of the tapping pipe 18. The flexible bellows 20 is disposed within the housing for a gas valve 22 and the gas burner 5 is mounted on this housing. Expansion or contraction of the flexible bellows 20 is transmitted by means of a push rod 21 to the gas valve 22 for displacing the latter which by means of a spring 26 is non-positively pressed against said push rod 21. Another flexible bellows 23 connected to a bail 25 is disposed within the gas valve housing. This bail 25 embraces the bellows 20 and the control rod 21 and can therefore also displace the gas valve 22 if the expansion rate of the bellows 23 exceeds that of the bellows 20. The flexible bellows 23 is in communication with a thermosensitive member 24 located at the bottom of the storage tank 1.

The principle of operation of the combined hot-water heater above described is the following: In the storing operation a continuous water circulation is caused by the convective force of the water heated in the pipe coil 6; the cold water flowing through the lower connecting pipe 2 to the pipe coil 6 and the heated water returning through the upper connecting pipe 3 to the storage tank 1. When the water in the storage tank 1 reaches the temperature set by the thermostat 23, 24, the gas valve 22 lowers the gas supply to the burner 5 to such an extent that the heater receives only so much heat as is required to maintain the set temperature.

In the tapping of the water a dynamic pressure difference between the upper and lower chambers, separated by the diaphragm 11, is produced by the resistance encountered in the pipe 27 by the stream of water passing therethrough and through the tank 1 and past the throttle valve 14. The action of this pressure difference moves the diaphragm 11 upwardly and the valve 12 so far into the valve seat until equilibrium between the lifting power of the diaphragm 11 and the counter pressure of the spring 13 is established. In the upward movement of the diaphragm 11 the connecting pipes 2 and 3 are shut off by the pistons 8 and 9. The hot water, forced out of the tank by the pressure of the cold water entering through the pipe 27, now passes through the by-pass pipes 28, 29 into the pipe coil 6, and after passing through the continuous-flow heater it passes through the tapping pipe 18 and tapping valve 30. Simultaneously therewith the water is reheated and metered; namely, in the same extent as the water leaving the tank through the by-pass pipe 28 and flowing into the upper chamber gets colder, the thermostat 15 is contracted and, by means of the valve 14, throttles the amount of water flowing through the tank. This throttling point, settable by the scale 17 and also changeable in dependence upon the temperature, determines the setting rate of the water quantity regulator whose control valve 12 is controlled by the spring-loaded diaphragm 11. Accordingly, independently of the fluctuating water pressure, only such an amount of water flows through the continuous-flow heater for reheating that the leaving water temperature set in accordance with the scale 17 is invariably obtained. The remaining temperature fluctuations of the leaving or service water, particularly those originating from fluctuations in pressure or fuel value of the gas, can be adjusted by controlling the gas supply to the burner 5 by means of the thermostat 19, 20.

In connection with the form of the invention above described it will be observed that also in reheating, as the water leaves the tank 1 at the top, the passage through the heater takes place from the bottom to the top. This has the advantage that also in the reheating of the stored water the usual conditions for the transmission of heat prevail in the continuous-flow heater.

What is claimed is:

A gas water heater consisting of a gas fired continuous-flow heater with a pipe coil to conduct the water to be heated, a storage tank, a connecting pipe leading from the upper end of the pipe coil to the upper portion of the storage tank, a tapping pipe having a tapping valve, said tapping pipe in connection with said connecting pipe, a second connection pipe leading from the second end of said pipe coil to the bottom of said storage tank, a cold water supply pipe connected to said second connection pipe, a shut off valve in each of said connecting pipes, means for closing said shut off valves on the opening of said tapping valve, a by-pass connection between said connection pipes by-passing said shut off valves and a temperature controlled valve inserted in said by-pass connection.

References Cited in the file of this patent

UNITED STATES PATENTS

| | | |
|---|---|---|
| 482,076 | Clarke | Sept. 6, 1892 |
| 886,100 | Walker | Apr. 28, 1908 |
| 1,282,072 | Grove | Oct. 22, 1918 |
| 1,303,054 | Goreau | May 6, 1919 |
| 1,451,551 | Muehleisen | Apr. 10, 1923 |
| 1,502,802 | Smythe | July 29, 1924 |
| 1,545,820 | Erickson | July 14, 1925 |
| 1,592,800 | Weilage | July 13, 1926 |
| 1,596,841 | Lauth | Aug. 17, 1926 |
| 1,727,015 | McClurg | Sept. 3, 1929 |
| 2,076,087 | Long | Apr. 6, 1937 |
| 2,303,382 | Newhouse | Dec. 1, 1942 |

FOREIGN PATENTS

| | | |
|---|---|---|
| 1,678 | Great Britain | of 1913 |